United States Patent [19]

Bourland

[11] Patent Number: 4,501,849

[45] Date of Patent: Feb. 26, 1985

[54] CHLORINATED POLYVINYL CHLORIDE MOLDING COMPOUND

[75] Inventor: Larry G. Bourland, Downingtown, Pa.

[73] Assignee: Atlantic Richfield Company, Los Angeles, Calif.

[21] Appl. No.: 613,848

[22] Filed: May 24, 1984

[51] Int. Cl.$^3$ .................... C08L 23/12; C08L 23/16; C08L 27/24; C08L 23/26
[52] U.S. Cl. .................................... 524/527; 525/86; 525/190; 525/192; 525/239; 525/194
[58] Field of Search ...................... 525/239, 192, 194; 524/527

[56] References Cited

U.S. PATENT DOCUMENTS 3,046,237 7/1962 Rosenfelder .................... 525/239
3,144,436 8/1964 Greene et al. .................... 525/387

Primary Examiner—Carman J. Seccuro
Attorney, Agent, or Firm—Dennis M. Kozak

[57] ABSTRACT

The incorporation of a high melt flow rate propylene-based polymer additive into a CPVC molding compound serves to retard the fusion rate of the CPVC compound during processing.

16 Claims, No Drawings

CHLORINATED POLYVINYL CHLORIDE MOLDING COMPOUND

This invention pertains to additives for chlorinated polyvinyl chloride (CPVC) plastics.

In one of its more specific aspects, this invention relates to the incorporation of a high melt flow rate propylene-based polymer additive into a CPVC molding compound for the purpose of retarding the fusion rate of the CPVC compound during processing.

Molding compounds comprising CPVC are well known. Generally, these compounds are prepared by adding to a base CPVC resin one or more components that will allow it to be processed into a finished product with desired properties and at minimum costs.

Rigid or unplasticized CPVC has a relatively high melt viscosity at typical processing tempertures. The processing consequences of this high melt viscosity are: (1) high mechanical energy is required for extruder screw rotation and material transport in the molten state, and (2) excessive frictional heat develops from the shear applied during processing and elevates the stock temperature which in turn causes serious thermal stability problems. High melt viscosities or frictional heat generation during processing do not cause serious processing problems for thermoplastics which are inherently stable to shear and processing temperature. Such stable thermoplastic materials may be processed either by increasing the processing temperature which decreases melt viscosity or by designing the processing equipment to handle viscous materials. However, these options are not applicable to CPVC resin due to its inherent shear and temperature instability. CPVC resin will degrade during high temperature and/or high shear rate processing.

Thus, in rigid CPVC compounding, lubricating additives are required to retard the fusion rate of the CPVC compound and, hence, control the frictional heat buildup resulting from conventional processing techniques such as extrusion, milling, calendering and injection molding, all of which involve the application of shear to promote fusion, melt homogeneity and flow. Types of lubricants which are conventionally employed for this purpose are the paraffinic waxes, glycerine monostearate based waxes, polyethylene waxes, calcium stearamide, and ethylene bis stearamide and their mixtures. It has not, however, been the practice to incorporate a high melt flow rate propylene-based polymer additive to effect such processing improvements.

This invention provides a novel CPVC compound which incorporates a high melt flow rate propylene-based polymer additive for the purpose of retarding the fusion characteristics of the CPVC compound.

As used herein, the term "high melt flow rate" means a melt flow rate equal to or greater than 300 grams/10 minutes measured using A.S.T.M. D-1238-78, Condition L. All melt flow rates herein were determined using this test method.

According to this invention there is provided a moldable compound comprising a chlorinated polyvinyl chloride resin and a high melt flow rate propylene-based polymer containing 0 to 15 mole % recurring units of an olefinic comonomer having the general formula:

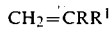

wherein R is a member selected from the group consisting of hydrogen and aromatic and aliphatic hydrocarbon groups containing 2 to 20 carbon atoms and $R^1$ is a member selected from the group consisting of hydrogen and methyl.

According to this invention, there is also provided a method of producing a molded compound which comprises forming a moldable compound comprising a chlorinated polyvinyl chloride resin and a high melt flow rate propylene-based polymer containing 0 to 15 mole % recurring units of an olefinic comonomer having the general formula:

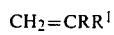

wherein R is a member selected from the group consisting of hydrogen and aromatic and aliphatic hydrocarbon groups containing 2 to 20 carbon atoms and $R^1$ is a member selected from the group consisting of hydrogen and methyl, and molding the resulting moldable compound.

Also, according to this invention, there is provided a method of retarding the fusion rate of a chlorinated polyvinyl chloride molding compound comprising a chlorinated polyvinyl chloride resin which method comprises incorporating into the chlorinated polyvinyl chloride molding compound a high melt flow rate propylene-based polymer containing 0 to 15 mole % recurring units of an olefinic comonomer having the general formula:

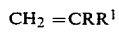

wherein R is a member selected from the group consisting of hydrogen and aromatic and aliphatic hydrocarbon groups containing 2 to 20 carbon atoms and $R^1$ is a member selected from the group consisting of hydrogen and methyl, the high melt flow rate propylene-based polymer being employed in an amount sufficient to retard the fusion rate of the molding compound upon processing.

In a preferred embodiment, the high melt flow rate propylene-based polymer additive is a high melt flow rate polypropylene.

In another preferred embodiment, the high melt flow rate propylene-based polymer additive is a high melt flow rate propylene-ethylene copolymer.

In another preferred embodiment, the high melt flow rate propylene-based polymer additive has a melt flow rate equal to or greater than 900 g/10 min.

The moldable CPVC composition of this invention will be comprised, preferably, of the following components:

(a) 100 parts of a chlorinated polyvinyl chloride base resin;

(b) from about 1 to about 5 phr of a stabilizer;

(c) from about 0.1 to about 10, preferably 0.5 to about 5 phr of the high melt flow rate propylene-based polymer;

(d) from about 0.5 to about 10 phr of a processing aid; and, (e) from about 3 to about 12 phr of an impact modifier.

The chlorinated polyvinyl chloride base resins suitable for use in this invention can be chlorinated homopolymers of vinyl chloride or chlorinated copolymers of vinyl chloride with up to about 20 weight percent of a copolymerizable olefinically unsaturated comonomer.

CPVC resins are typically prepared by the post chlorination of polyvinyl chloride resin via bubbling chlorine gas into the solvent swollen polyvinyl chloride resin and are available with weight percent chlorine contents within the range of from about 63 to about 68.5. CPVC resins are commercially available from B. F. Goodrich and Kaneka America. Reference is made to Chapter 17 "The Compounding of Polyvinyl Chloride" by N. L. Perry, Encyclopedia of PVC volume 2, ©1977 the teachings of which are incorporated herein by reference thereto due to their applicability to CPVC compounding as well as PVC compounding.

To inhibit the degradation that the CPVC base resin would undergo at processing temperatures, a stabilizer is added. Suitable stabilizers are well known and include tin mercaptides, tin carboxylates, barium-cadmiums, calcium-zincs and leads.

The high melt flow rate propylene-based polymer additive which is employed in this invention exhibits Newtonian flow characteristics and is an isotatic, crystalline propylene homopolymer or copolymer as previously defined. It will have a peak molecular weight of from about 15,000 to about 60,000. Suitable propylene-based polymers are prepared by the degradation of higher molecular weight propylene-based polymers and are commercially available. U.S. Pat. No. 3,144,436 teaches a method for degrading steroregular polymers and is incorporated herein by reference thereto. The high melt flow rate propylene-based polymer will have a melt flow rate equal to or greater than 300 g/10 mins., preferably equal to or greater than 900 g/10 mins.

Particularly suitable for use in this invention are the high melt flow rate propylene-based polymers designated Arvis TM resins, available from ARCO Chemical Company, division of Atlantic Richfield Company.

Arvis TM 1000 resin is a visbroken propylene homopolymer having a peak molecular weight of 47,000, a melt flow rate of 1600 g/10 min. and a melting point as determined by differential scanning calorimetry (DSC) of about 165° C.

Arvis TM 3000 resin is a visbroken 2.5 wt. % ethylene/propylene copolymer having a peak molecular weight of 42,000, a melt flow rate of 1800 g/10 min. and a melting point by DSC of about 148° C.

Arvis TM 5000 resin is a visbroken 4.5 wt. % ethylene/propylene copolymer having a peak molecular weight of 48,000, and a melting point by DSC of about 132° C.

Various processing aids can be employed and are commercially available, these are the acrylics, α-methyl styrene, styrene-acrylonitrile copolymers and chlorinated polyethylenes.

Impact modifiers are such as are conventionally employed and include acrylics, ABS resins, chlorinated polyethylenes, and the ethylene/vinyl acetate/carbon monoxide terpolymers designated Elvaloy® resin modifiers by E. I. Du Pont.

Optionally, for certain specific applications, the CPVC compound can be formulated to also include various pigments, fillers, antistatic agents, reoderants, dulling or flattening agents and the like.

The invention is demonstrated by the following examples.

EXAMPLES 1-6

A series of six (6) CPVC molding compounds was prepared by intensive dry mixing, individually, the ingredients set forth in Table I.

TABLE I

| Ingredient | Example No. | | | | | |
|---|---|---|---|---|---|---|
| | 1 (control) | 2 | 3 | 4 | 5 | 6 |
| chlorinated polyvinyl chloride resin[1] | 100 | 100 | 100 | 100 | 100 | 100 |
| stabilizer[2] | 1.0 | 3.0 | 3.0 | 3.0 | 2.0 | 1.0 |
| HMFR additive[3] | 0 | 1.0 | 2.0 | 3.0 | 3.0 | 3.0 |

[1] Geon ® 625 × 563 CPVC resin (B.F. Goodrich)
[2] Mark 1900 mercapto-tin stabilizer (Argus Chemical Div. of Witco Chemical Corp.)
[3] HMFR = high melt flow rate; 1:1 ratio of Arvis 3000 resin and Arvis 5000 resin
Compositions in parts per 100 parts of CPVC resin (phr)

Brabender fusion data for the six CPVC molding compounds (Examples 1-6) were obtained by separately introducing a 69 gram charge of each of the six compounds into a Brabender mixing bowl equipped with No. 6 roller blades and mixing at 170° C. and 64 rpm. Table II shows the resulting Brabender fusion data.

TABLE II

| Compound of Example No. | Fusion Time* (Minutes) | Ultimate Torque (M-g) |
|---|---|---|
| 1 (control) | 0.4 | 3.650 |
| 2 | 1.1 | 2.500 |
| 3 | 1.4 | 2.300 |
| 4 | 1.4 | 2.200 |
| 5 | 1.5 | 2.250 |
| 6 | 0.9 | 2.300 |

*time required to reach maximum torque

EXAMPLES 7-8

For comparison, Examples 3 and 4 were reformulated to exclude the 2.0 and 3.0 phr of the HMFR additive and to include in place thereof 2.0 and 4.0 phr (Examples 7 and 8, respectively) of a conventional lubricant comprised of a 1:1 ratio of calcium stearate and ethylene bis-stearamide wax.

Brabender fusion data were obtained following the above procedure and are shown in Table III.

TABLE III

| Compound of Example No. | Fusion Time* (Minutes) | Ultimate Torque (M-g) |
|---|---|---|
| 7 | 0.3 | 3.700 |
| 8 | 0.3 | 3.500 |

*time required to reach maximum torque

Comparing the data of Tables II and III shows that the CPVC compounds of the invention (those including a HMFR additive) exhibit marked improvements in fusion rates as compared to the CPVC compounds not according to the invention, that is, comparative Examples 7 and 8.

It will be evident from the foregoing that various modifications can be made to this invention. Such, however, are considered as being within the scope of the invention.

What is claimed is:

1. A molding compound comprising a chlorinated polyvinyl chloride resin and a high melt flow rate isotactic propylene-based polymer containing 0 to 15 mole % recurring units of an olefinic comonomer having the general formula:

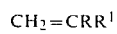

$$CH_2=CRR^1$$

wherein R is a member selected from the group consisting of hydrogen and aromatic and aliphatic hydrocarbon groups containing 2 to 20 carbon atoms and $R^1$ is a member selected from the group consisting of hydrogen and methyl, said high melt flow rate propylene based polymer having a melt flow rate of at least 300 grams/10 minutes measured using ASTMD-1238-79 Condition 2.

2. The molding compound of claim 1 in which said high melt flow rate propylene-based polymer has a melt flow rate of at least 900 grams/10 minutes measured using A.S.T.M. D-1238-79 Condition L.

3. The molding compound of claim 1 in which said high melt flow rate propylene-based polymer has a peak molecular weight of from about 15,000 to about 60,000.

4. The molding compound of claim 1 in which said high melt flow rate propylene-based polymer is a propylene homopolymer.

5. The molding compound of claim 1 in which said high melt flow rate propylene-based polymer is a propylene-ethylene copolymer.

6. The molding compound of claim 1 comprising a stabilizer.

7. The molding compound of claim 1 comprising a processing aid.

8. The molding compound of claim 1 comprising an impact modifier.

9. The molding compound of claim 1 in which said high melt flow rate propylene-based polymer is employed in an amount within the range of from about 0.1 to about 10 parts per each 100 parts of polyvinyl chloride resin.

10. The molding compound of claim 1 in which said high melt flow rate propylene-based polymer is employed in an amount within the range of from about 0.5 to about 5 parts per each 100 parts of polyvinyl chloride resin.

11. The molding compound of claim 1 in which said chlorinated polyvinyl chloride resin is a chlorinated copolymer of vinyl chloride with up to about 20 weight percent of a copolymerizable olefinically unsaturated comonomer.

12. A method of retarding the fusion rate of a chlorinated polyvinyl chloride molding compound comprising a chlorinated polyvinyl chloride resin which method comprises incorporating into the chlorinated polyvinyl chloride molding compound a high melt flow rate isotactic propylene-based polymer containing 0 to 15 mole % recurring units of an olefinic comonomer having the general formula:

$$CH_2=CRR^1$$

wherein R is a member selected from the group consisting of hydrogen and aromatic and aliphatic hydrocarbon groups containing 2 to 20 carbon atoms and $R^1$ is a member selected from the group consisting of hydrogen and methyl, the high melt flow rate propylene-based polymer being employed in an amount sufficient to retard the fusion rate of the molding compound upon processing, said high melt flow rate propylene based polymer having a melt flow rate of at least 300 grams/10 minutes measured using ASTMD-1238-79 Condition 2.

13. A method of producing a molded compound which comprises forming a molding compound comprising a chlorinated polyvinyl chloride resin and a high melt flow rate isotactic propylene-based polymer containing 0 to 15 mole % recurring units of an olefinic comonomer having the general formula:

$$CH_2=CRR^1$$

wherein R is a member selected from the group consisting of hydrogen and aromatic and aliphatic hydrocarbon groups containing 2 to 20 carbon atoms and $R^1$ is a member selected from the group consisting of hydrogen and methyl, and molding the resulting compound, said high melt flow rate propylene based polymer having a melt flow rate of at least 300 grams/10 minutes measured using ASTMD-1238-79 Condition 2.

14. The method of claim 13 comprising incorporating a stabilizer into the molding compound.

15. The method of claim 13 comprising incorporating a processing aid into the molding compound.

16. The method of claim 13 comprising incorporating an impact modifier into the molding compound.

* * * * *